(12) United States Patent  (10) Patent No.: US 7,815,143 B2
Bryant  (45) Date of Patent: Oct. 19, 2010

(54) AIRCRAFT LANDING GEAR TRUCK ORIENTATION FOR NOISE REDUCTION

(75) Inventor: Malcolm S. Bryant, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 11/464,105

(22) Filed: Aug. 11, 2006

(65) Prior Publication Data

US 2008/0035790 A1  Feb. 14, 2008

(51) Int. Cl.
*B64C 25/00* (2006.01)
*B64C 25/34* (2006.01)
(52) U.S. Cl. .................... 244/1 N; 244/102 R
(58) Field of Classification Search ............ 244/102 R, 244/102 A, 102 SS, 1 N, 100 R, 104 FP, 183, 244/81, 102 SL
See application file for complete search history.

(56) References Cited

U.S. PATENT DOCUMENTS 2,645,437 A * 7/1953 Giovanni ................ 244/103 R
3,195,840 A * 7/1965 Tollar ..................... 244/102 R
3,687,400 A * 8/1972 Fitzgerald et al. ........ 244/102 R
3,845,919 A * 11/1974 Jenny ..................... 244/103 R
5,110,068 A * 5/1992 Grande et al. .......... 244/102 SL
6,173,920 B1 * 1/2001 Meneghetti ............. 244/100 R
6,575,405 B2 * 6/2003 Bryant et al. .......... 244/102 SL
6,619,587 B1  9/2003 Chow et al.
6,786,451 B2  9/2004 Courtois et al.

OTHER PUBLICATIONS

Guo, Yueping, "Empirical Prediction of Aircraft Landing Gear Noise", Jul. 2005, NASA CR-2005-213780.*

* cited by examiner

*Primary Examiner*—Tien Dinh
*Assistant Examiner*—Richard R Green
(74) *Attorney, Agent, or Firm*—Tung & Associates

(57) ABSTRACT

Methods of reducing aircraft noise from landing gear during take off and landing maneuvers. An actuated multi-axle landing gear truck is oriented such that a plane through the axles is substantially parallel to the aircraft water line during approach and takeoff. The embodiment retains the capability to re-orient the truck "toes up" or "toes down," as may be required, just before touchdown to facilitate rapid application of braking and speed brake/spoiler deployment. It also maintains the capability to re-orient the truck during gear retraction after take off to fit into the aircraft wheel wells. The invention may be retrofitted to existing aircraft or deployed on new aircraft.

11 Claims, 8 Drawing Sheets

AIRCRAFT LANDING GEAR TRUCK ORIENTATION FOR NOISE REDUCTION

TECHNICAL FIELD

The present invention relates generally to the landing gear of aircraft. More particularly, the present invention relates to landing gear truck of an aircraft that can be oriented to reduce noise.

BACKGROUND

It is well known that aircraft, especially large jet propelled aircraft are a source of noise on take off and landing. In general, the engines generate much of the noise and efforts have been directed toward designing engines with an objective of engine noise reduction, while meeting other necessary criteria. Noise reduction is not only an environmental issue, but it has become an economic issue since airport fees may be based upon the intensity of noise that an aircraft produces, as measured in decibels.

Most of the concern about aircraft noise centers around noise at or near airports during take off and landing. During landing, large aircraft, such as typical large passenger and cargo aircraft deploy wheeled landing gears. An aircraft may have multiple landing gear assemblies. A single aircraft landing gear assembly may include front wheels rotating about a front axle and rear wheels rotating around a rear axle. The axles are coupled to a central strut extending from between the two axles to connect retractably to the aircraft. This multi-axle assembly is generally referred to as a "landing gear truck." Conventionally, a truck positioning actuator is used to position multi-axle trucks either "toes up" (i.e. with forward wheels (toes) at a higher position than rear wheels of a truck) or "toes down" (i.e. with forward wheels at a lower position than rear wheels of a truck) when the landing gear is extended. Upon landing, the force of touch down causes the truck to rotate to so that front and rear wheels are aligned substantially horizontally on the ground. The rotation of the truck beam is sensed and is used as indication of touchdown. This facilitates early application of braking and speed brake/spoiler deployment during touchdown. Noise is measured at this landing phase of aircraft operation and some airports asses fees based on noise produced. These fees are set on a sliding scale with fee reductions for quieter aircraft as compared to noisier counterparts.

Accordingly, there yet exists a need for aircraft noise reduction at airports. It is a desirable goal to reduce aircraft noise at take off and landing for both environmental and economic reasons. Noise reduction apparatus that is activated at landing, and that can be retrofitted to existing aircraft, presents a significant benefit to the environment and may be cost effective if the cost of the apparatus is offset by reduced airport landing fees. Furthermore, other desirable features and characteristics of the present invention will become apparent from the subsequent detailed description and the appended claims, taken in conjunction with the accompanying drawings and the foregoing technical field and background.

BRIEF SUMMARY

Embodiments of the invention provide an apparatus that can be retrofitted to existing aircraft and applied in new aircraft, and methods of using the apparatus. Use of the apparatus results in a measurable reduction in noise during landing and landing. In some embodiments, the noise reduction relative the same aircraft not using the invention is about 3 dB.

The invention is based on the discovery that the orientation of an aircraft landing gear truck plays a significant role in noise generation at take off and landing because the orientation affects the pattern of airflow over the landing gear truck that is in turn related to noise generation. Accordingly, embodiments of the invention provide a landing gear truck that can be oriented to minimize noise, and methods of so orienting the landing gear truck.

In one embodiment, the invention provides an actuated multi-axle landing gear truck that is oriented such that a plane through the axles is substantially parallel to the aircraft water line during approach and takeoff. The embodiment retains the capability to re-orient the truck "toes up" or "toes down," as may be required, just before touchdown to facilitate rapid application of braking and speed brake/spoiler deployment. It also maintains the capability to re-orient the truck during gear retraction after take off to fit into the aircraft wheel wells. The embodiment may be retrofitted to existing aircraft or deployed on new aircraft.

In another embodiment, the invention provides a method of reducing noise during landing from an aircraft landing gear that has a multi-axle truck. The method includes orienting the multi-axle truck such that a plane through axles of the truck is substantially parallel to a waterline of the aircraft; and maintaining the angle of the multi-axle truck during air-borne landing maneuvers.

Another embodiment provides a method of reducing noise during aircraft take off for an aircraft with a landing gear that has a multi-axle truck. The method includes orienting the multi-axle truck such that a plane through axles of the truck is substantially parallel to a waterline of the aircraft; and maintaining the angle of the multi-axle truck until the landing gear may be retracted.

Other embodiments described herein provide advantages of noise reduction and may be applicable to a wide range of aircraft with multi-axle landing gear trucks. Further embodiments that utilize the principle of landing gear truck orientation to reduce noise are within the scope of the invention, as claimed here below.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

In general, aircraft may be visualized as having a plane known as a waterline extending horizontally through the aircraft. An aircraft fuselage is generally not planar along its underside, but curved for aerodynamic and other reasons. Accordingly, aligning a plane parallel to the underbody presents issues of aligning the plane with a curved surface. However, the waterline may be visualized as a plane, and alignment with the waterline is both practical and feasible.

In the specification and claims, the term "substantially parallel to the waterline" referring to a plane through a multi-axle truck means that the truck plane deviates less than about five degrees from the waterline, and typically deviates only in the range zero to about three degrees from the waterline.

In the specification and claims, a multi-axle landing gear truck means a truck that has at least two axles: a forward and an aft axle, regardless of number of wheels per axle. Orientation of a plane through centers of the axles orients the landing gear truck relative to the aircraft waterline.

In the specification and claims, the term "toes up," referring to a multi-axle landing gear truck, means the forward axle is at a higher elevation than the aft axle. Conversely, the term "toes down" means that the forward axle is at a lower elevation than the aft axle.

In general, hydraulic control systems are well known in the aerospace industry and have proven reliability. Control systems of this type are used to control landing gear positions: typically to position the landing gear truck for retraction after take off, to retract the landing gear, and to extend and position the landing gear truck on approach to landing (toes up or toes down). While an aircraft might land with the landing gear truck either toes up or toes down, upon landing, landing forces (mass of aircraft and gravitational and momentum effects) tend to urge the landing gear truck into a horizontal landing position. However, existing hydraulic control systems do not generally permit controlled orientation of a landing gear truck to more than two positions. These two positions are chosen to facilitate sensing of on-ground for rapid application of braking and speed brake/spoiler deployment and to allow the gear to fit into the wheel well for gear retraction. Existing systems have not been used for the purpose of positioning the truck horizontally when the landing gear is extended for purposes of noise reduction.

An embodiment of the invention provides controlled actuators that may be used to control landing gear truck orientation. In one embodiment, the actuators are controlled by hydraulic control systems, but other suitable control systems may be used as well. In one embodiment, the actuator extends forward from a vertical landing gear support member (a "forward mount") for attachment proximate the front end of the multi-axle landing gear truck. In another embodiment, the actuator extends aft from a vertical landing gear support member (a "rear mount") for attachment proximate the rear end of the multi-axle landing gear truck. For brevity, the following description and related drawings focuses on forward mounted actuator embodiments on the premise that a person of skill in the art having read the description will understand how to make appropriate modifications to use with rear mounted actuator embodiments of the invention.

In one embodiment of the invention, a forward mounted actuator that controls orientation of the multi-axle landing gear truck is controlled by control of piston travel within a surrounding sleeve. The piston travel is controlled with a floating piston, a device located beneath the piston to limit the extent of piston downward travel in the piston sleeve, under control of a hydraulic system. Accordingly, when the piston downward travel is limited by the floating piston, the landing gear truck is substantially aligned with the waterline of the aircraft. When the piston travel is not so limited, it is either toes up or toes down, depending upon whether the actuator is front or aft mounted. This invention may be retrofitted to existing aircraft with multi-axle landing gear trucks by replacing the existing truck positioning actuators with one as described in this invention and adding suitable hydraulic and electrical control circuits.

Figure 1A:
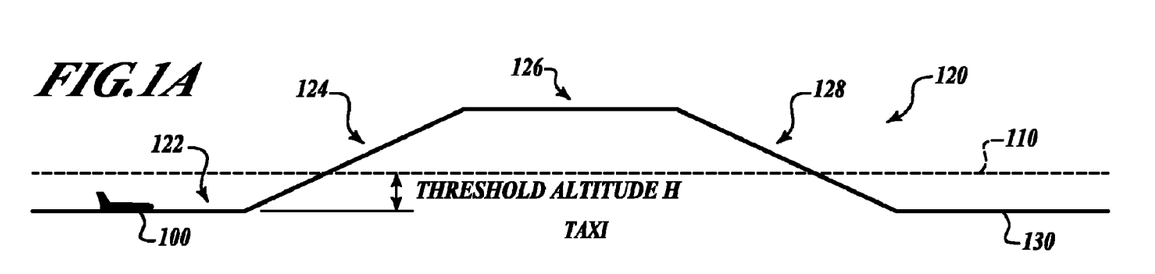
FIG. 1A is a schematic representation of an aircraft taxiing on the ground on a flight path and depicting a threshold altitude.
Figure 1B:
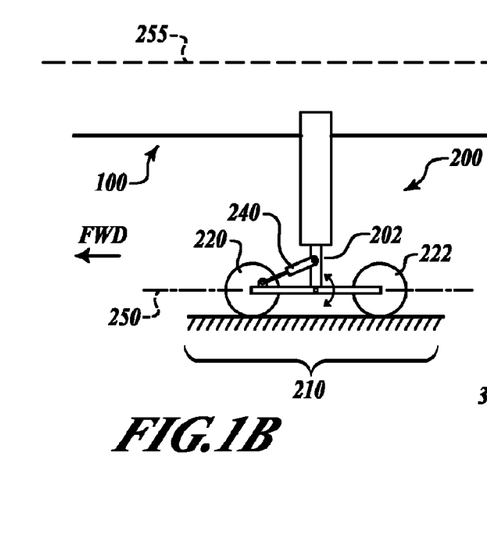
FIG. 1B is a schematic representation of a side view of a multi-axle landing gear truck with wheels on the ground.
Figure 1C:
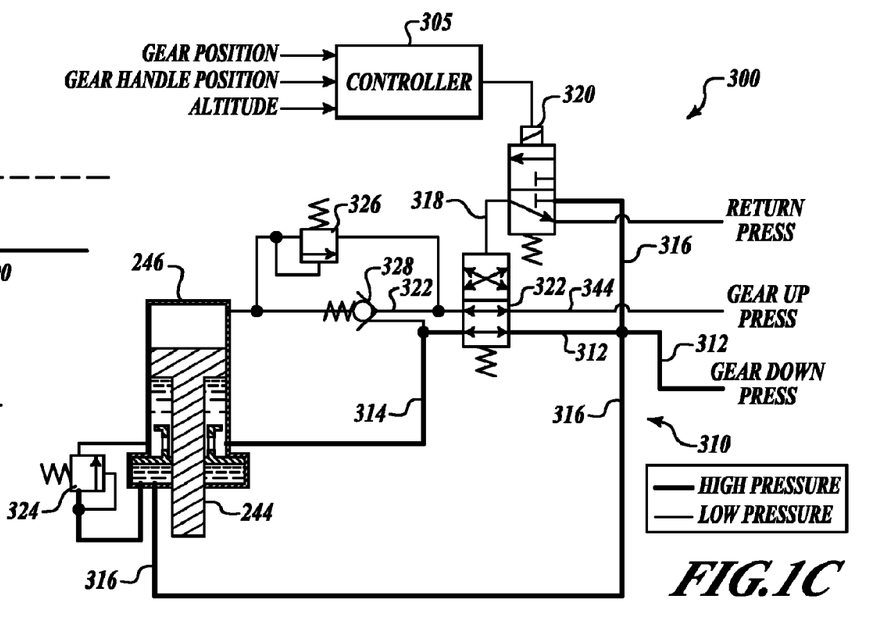
FIG. 1C is schematic flow diagram depicting an embodiment of a hydraulic control system of the invention configured to control orientation of the multi-axle landing gear truck.

Referring to FIGS. 1A-C, an aircraft 100 is taxiing on the ground for take off. The aircraft is at ground level, and is below a "threshold" altitude 110, which will be discussed here below. The aircraft flight path 120 has essentially five segments: taxiing 122, take off and ascent 124, cruising 126, descent 128 and landing 130. While the aircraft 100 is taxiing on the runway, the landing gear 200 is extended. The landing gear truck 210 has a forward axle (not shown) to which is mounted at least one wheel 220, and an aft axle (not shown) to which is mounted at least one rear wheel 222. A plane 250 extends through the centers of the axles (coinciding with the centers of wheels 220 and 222). This plane 250 is vertically spaced from the aircraft waterline 255. In the embodiment shown, an actuator 240 has a lower end attached proximate a forward portion of the landing gear truck 210, and an upper end attached to the landing gear support member 202. Accordingly, the multi-axle landing gear truck 210 has a forward mounted actuator 240, as shown. Since the aircraft 100 is on the ground, the plane 250 is substantially parallel to the ground and to the waterline 255.

Referring more especially to FIG. 1C, a hydraulic control system 300 controls the position of a piston rod 244 of the actuator 240 thereby controlling the extent to which the actuator 240 is extended or retracted. The illustrated embodiment of a hydraulic control system 300 includes a controller 305, a hydraulic circuit 310, and an assortment of valves 320, 322, 324, 326, 328 to control hydraulic pressure, and thereby the position of piston rod 244 which controls actuator 240 extension and landing gear truck 210 orientation.

Figure 8:
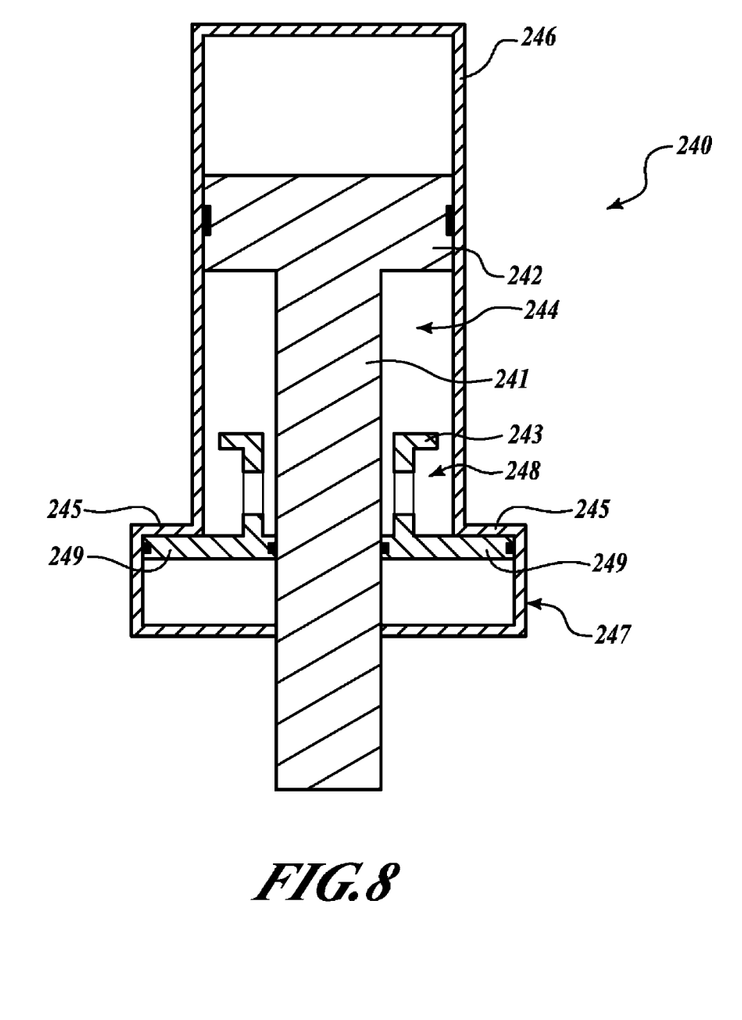
FIG. 8 is a schematic illustration in cross sectional view of an embodiment of an actuator useful in the present invention.

Referring to FIG. 8, a simplified cross sectional view of an embodiment of an actuator, the piston rod 244 reciprocates within a sleeve 246. The piston rod 244 has a cylindrical head 242 of larger diameter than the cylindrical piston body 241, as also shown in other accompanying figures, and the piston head 242 seals against the inner cylindrical walls of the sleeve 246. A floating piston 248 is located below the piston rod 244, and is able to move freely ("float") relative to the piston rod 244. The floating piston 248 in this embodiment has an upper cylindrical lip 243 that is sized to reciprocate within the sleeve 246 and a lower cylindrical lip 249 extending outward, with a diameter greater than the inner diameter of the sleeve 246. The lower lip 249 of the floating piston 248 reciprocates within a cylindrical base portion 247 of the sleeve 246 that has a larger diameter than the sleeve 246. The lower lip 249 seals against the inner cylinder walls of the sleeve 247 and against the outer walls of the piston body 241. An outward extending wall 245 connects sleeve 246 to sleeve base portion 247. The outward extending wall 245 at the lower end of the sleeve 246 acts as a stop to limit further upward movement of the floating piston 248. Thus, floating piston 248 is limited in its reciprocating movement. Other hydraulic or non-hydraulic control systems are also useful, and are within the scope of the invention.

The controller 305 may be any suitable device that has the capability to receive inputted data that includes landing gear position, landing gear handle position, and altitude, and that can generate an output from these to control the position of piston rod 244 when using the hydraulic circuit embodiment of the invention. In general, the controller 305 may be electronic and may be a microprocessor or a programmable digital (or analog) signal processor. The processor controls the solenoid operated pilot valve 320 of the hydraulic circuit 310. In the landing gear down position, with the aircraft on the ground, the solenoid operated pilot valve 320 is closed, and hydraulic pressure in circuit 310 is highest in lines 312, which communicates with line 316. Horizontal positioning valve 322 is open, so that line 312 is able to pressurize line 314. Line 314 applies hydraulic pressure to the underside of piston rod 244, thereby attempting to lift it. The landing truck 210 is held substantially horizontal by contact of the tires with the ground. Fluid from line 316 applies pressure under floating piston 248 and causes it to lift, but it is not in contact with an underside of piston rod 244, and so has no particular function in this mode of operation. The hydraulic circuit 310 also includes pressure relief valves 324 and 326, and check valve 328, the operations of which are discussed here below, as these come into operation.

Figure 2A:
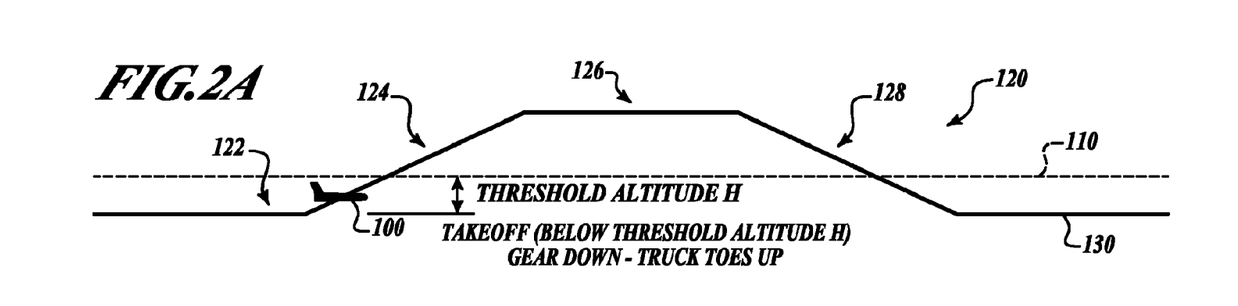
FIG. 2A is a schematic representation of an aircraft on a flight path, after take off but below a depicted threshold altitude.
Figure 2B:
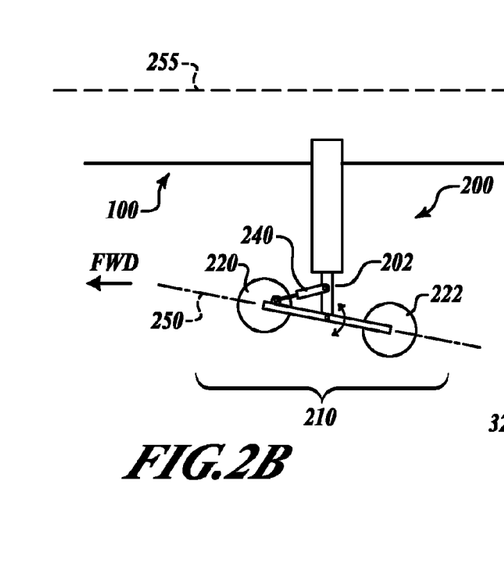
FIG. 2B is a schematic representation of a side view of a multi-axle landing gear truck with wheels toes up.
Figure 2C:
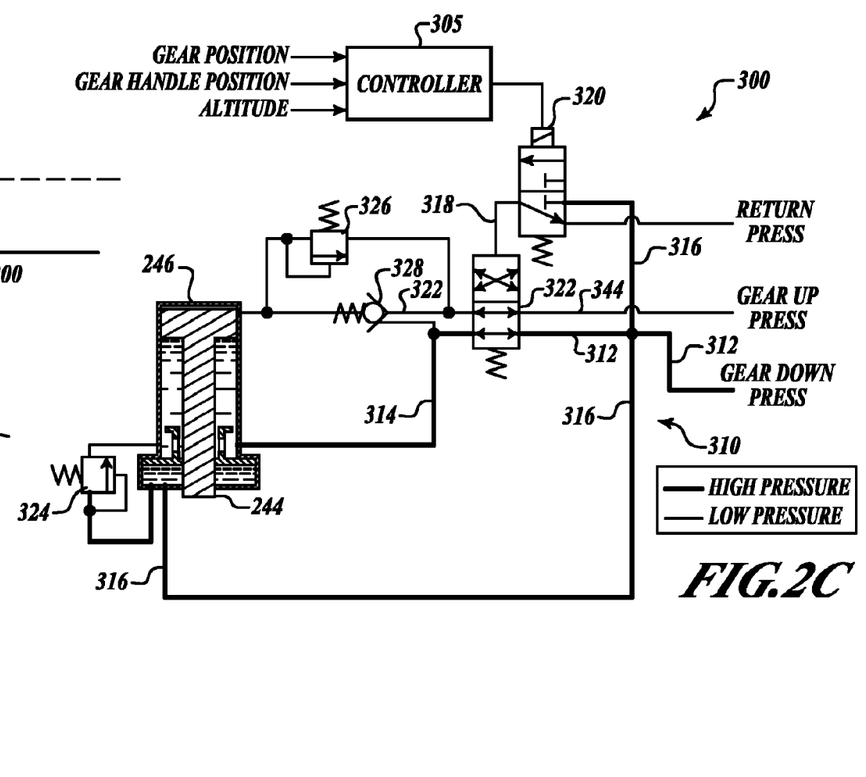
FIG. 2C is schematic flow diagram depicting an embodiment of a hydraulic control system of the invention configured to control orientation of the multi-axle landing gear truck.

Referring to FIGS. 2A-C, the aircraft 100 has taken off but is still below the threshold altitude 110. Since the aircraft 100 is no longer in ground contact, ground loads are no longer exerted on the landing gear truck 210. Accordingly, the gear down pressure in line 312 that is transferred to lines 314 and 316 is sufficient to lift piston rod 244 to its fullest extent, in this embodiment. Of course, a stop mechanism may be used to restrict the upward extent of vertical piston travel. When piston rod 244 is at this highest position, the actuator 240 is retracted and the landing gear truck 210 assumes a toes up orientation. Once again, floating piston 248, while urged upward by fluid pressure, does not affect the position of piston rod 244 or the landing gear truck 210 orientation.

Figure 3A:
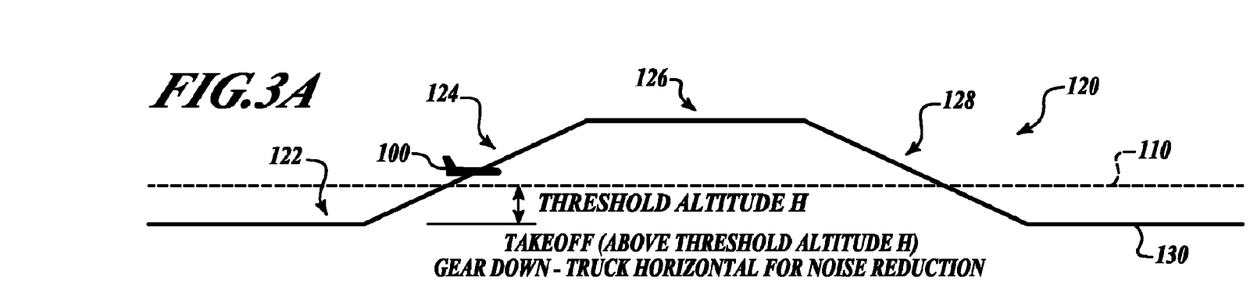
FIG. 3A is a schematic representation of an aircraft on a flight path above a depicted threshold altitude.
Figure 3B:
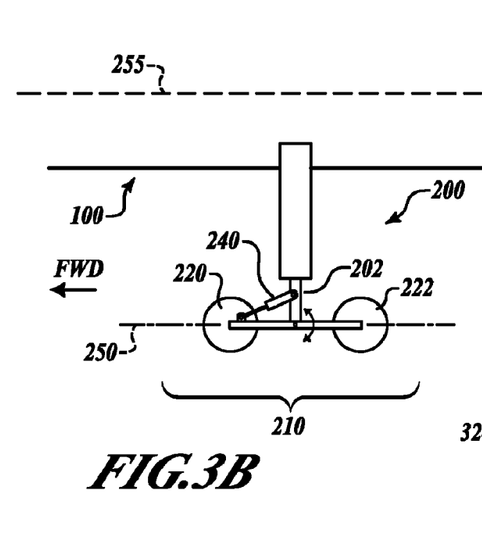
FIG. 3B is a schematic representation of a side view of a multi-axle landing gear truck with a plane through wheel axles substantially parallel to an aircraft waterline.
Figure 3C:
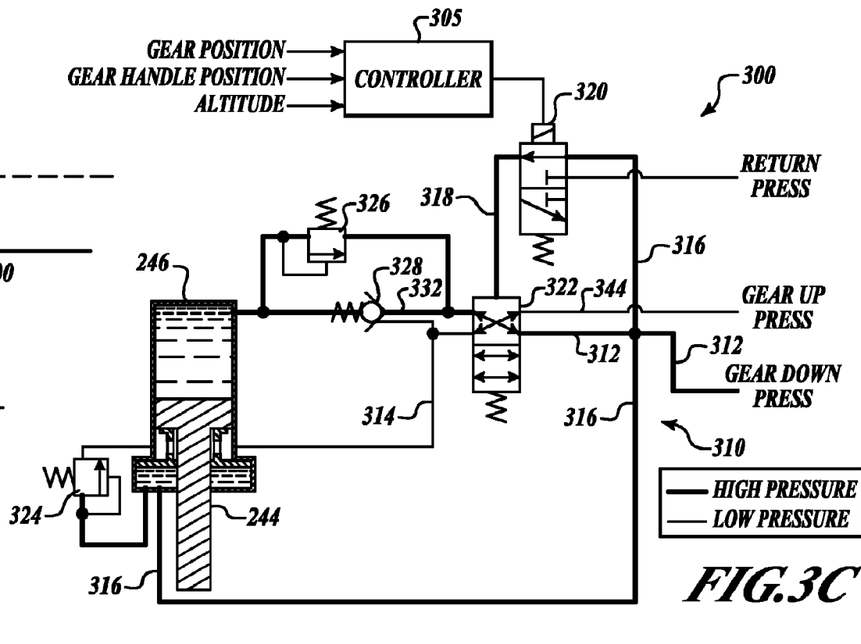
FIG. 3C is schematic flow diagram depicting an embodiment of a hydraulic control system of the invention configured to control orientation of the multi-axle landing gear truck.

FIGS. 3A-C depict the aircraft 100 ascending to above the threshold altitude 110. At this point, the controller 305 that monitors gear position, altitude and gear handle position, commands the solenoid operated control valve 320 to open, permitting pressurization of line 318 that communicates with high pressure line 312. This causes the horizontal positioning valve 322 to open to permit line 312 to pressurize line 332. Fluid flows into the sleeve 246 above the piston rod 244 and forces the piston rod downward. The piston rod 244 then moves downward to a stop position. This stop position is controlled by the floating piston 248 located below the piston rod 244 that is urged upward by high pressure fluid from line 316 and urges against the underside of the piston rod 244. Thus the position of the piston rod 244 is controlled by fluid pressure from above in the sleeve 246 and force from below exerted by the floating piston 248. Accordingly, the floating piston 248 now plays a role in determining the position of the piston rod 244. The extent of displacement of the piston rod 244 extends the actuator 240 such that the horizontal plane 250 through the axles of landing gear truck 210 is substantially parallel to the waterline 255 of aircraft 100 to reduce noise.

Figure 4A:
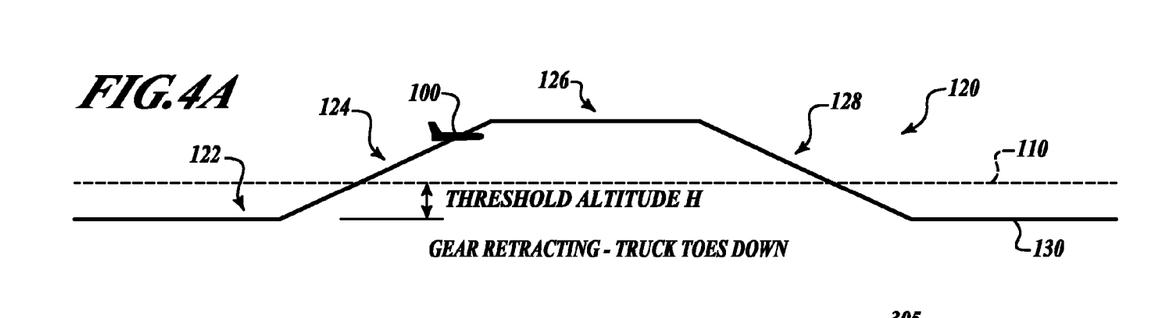
FIG. 4A is a schematic representation of an aircraft on a flight path at an altitude above a threshold altitude, with landing gear being retracted.
Figure 4B:
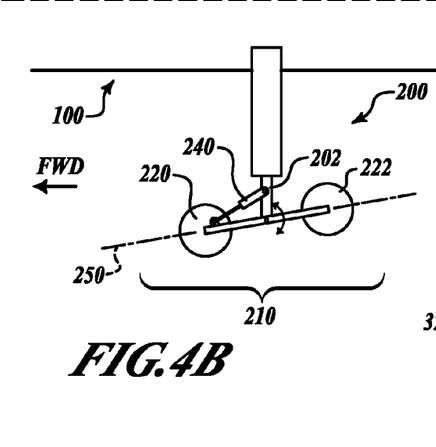
FIG. 4B is a schematic representation of a side view of a multi-axle landing gear truck with wheels in toes down position for retracting the landing gear.
Figure 4C:
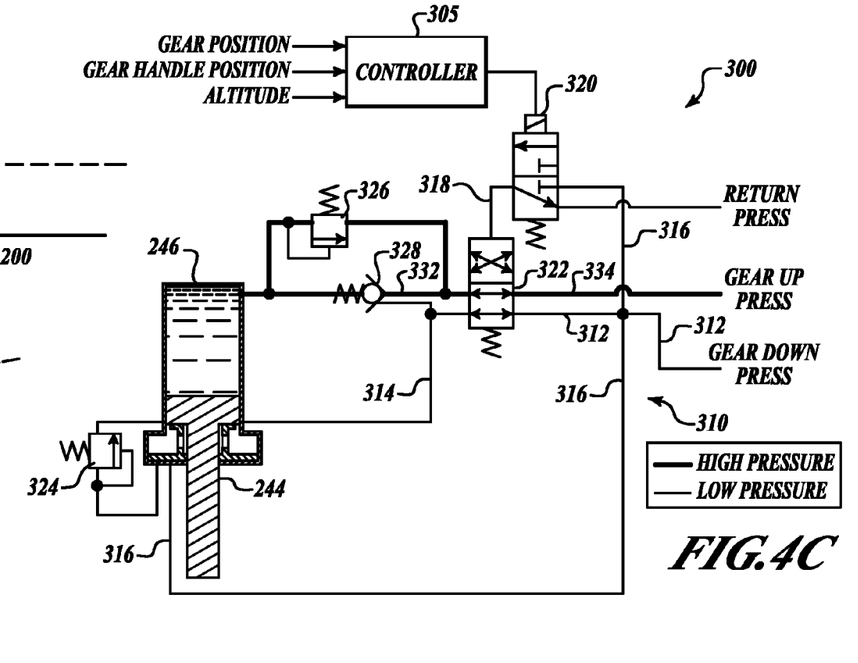
FIG. 4C is schematic flow diagram depicting an embodiment of a hydraulic control system of the invention configured to control orientation of the multi-axle landing gear truck.

In FIGS. 4A-C, aircraft 100 is retracting its landing gear. In this embodiment, the retracting landing gear 200 must have a toes down landing gear truck 210 position. Of course, other embodiments may require from toes down to toes up to fit into the wheel well. The controller 305, based on altitude gear position and gear handle position, closes solenoid operated valve 320. Pressure in the hydraulic circuit 310 has now changed so that pressure is highest in line 334, and pressure in line 312 is low. Pressurized fluid in line 334 flows through horizontal positioning valve 322 into line 332 which becomes pressurized. Fluid from line 332 enters sleeve 246 above piston rod 244 forcing it downward in the sleeve 246. Since line 316 is now low pressure, the floating piston 248 is not pressurized upward, but comes to rest on the base of sleeve 246. Accordingly, piston rod 244 descends to a lower level than shown in FIG. 3B, and actuator 240 extends further. This further extension of actuator 240 causes the landing truck 210 to assume a toes down orientation, for landing gear retraction, as the forward portion of the truck 210 is pushed down by the actuator 240.

Figure 5A:
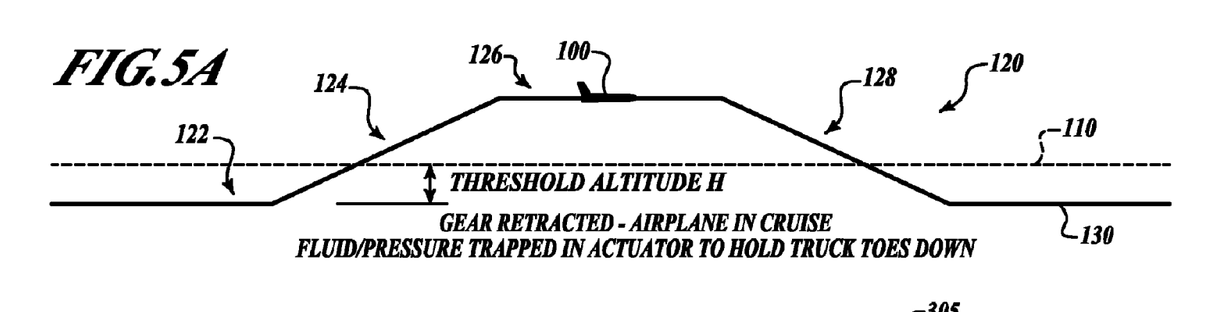
FIG. 5A is a schematic representation of an aircraft on at cruise altitude on a flight path with a threshold altitude depicted.
Figures 5B, 5C:
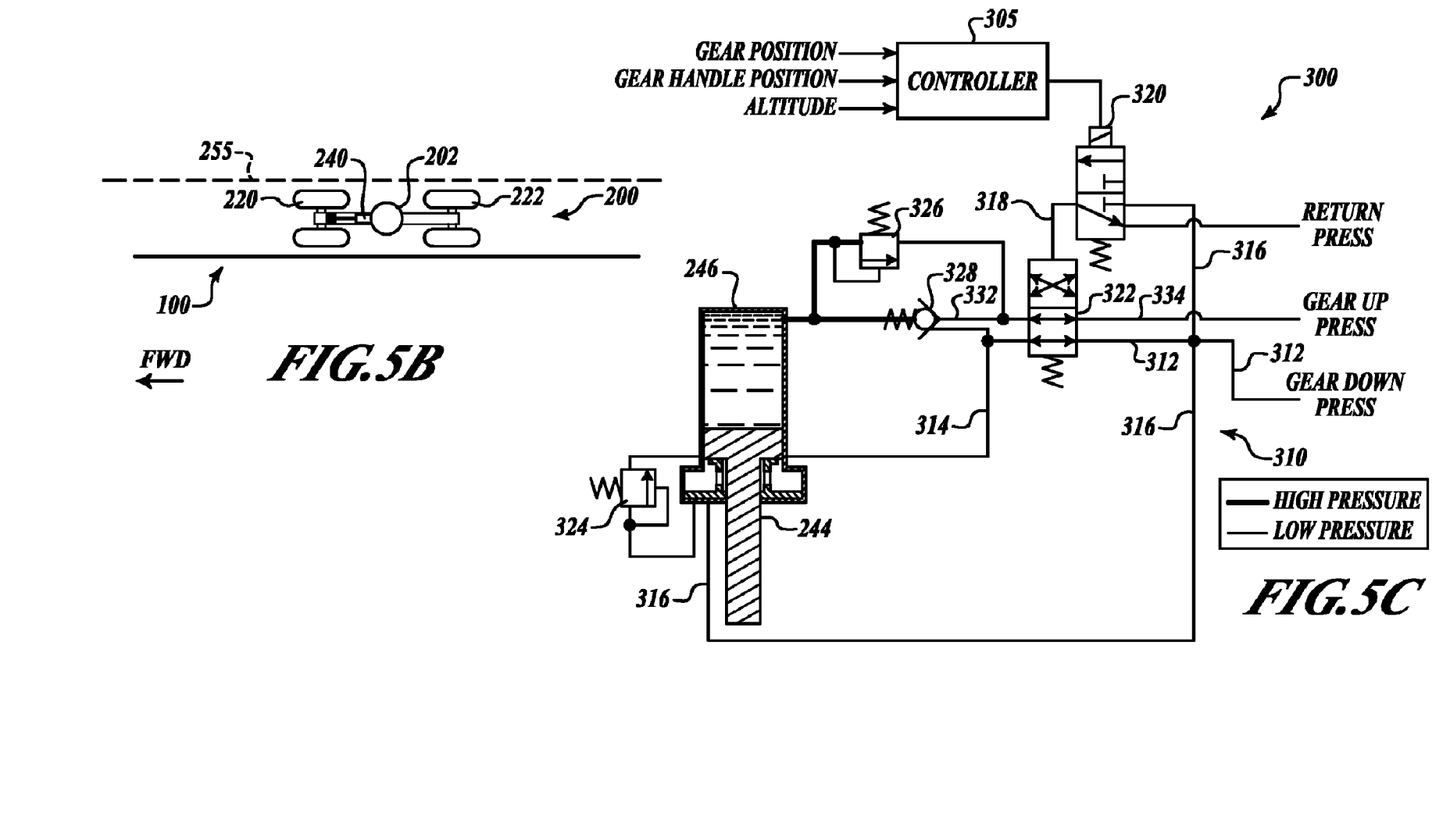
FIG. 5B is a schematic representation of a side view of a multi-axle landing gear truck with wheels oriented for retracted landing gear, toes down, in this embodiment.
FIG. 5C is schematic flow diagram depicting an embodiment of a hydraulic control system of the invention configured to control orientation of the multi-axle landing gear truck.
Figure 6A:
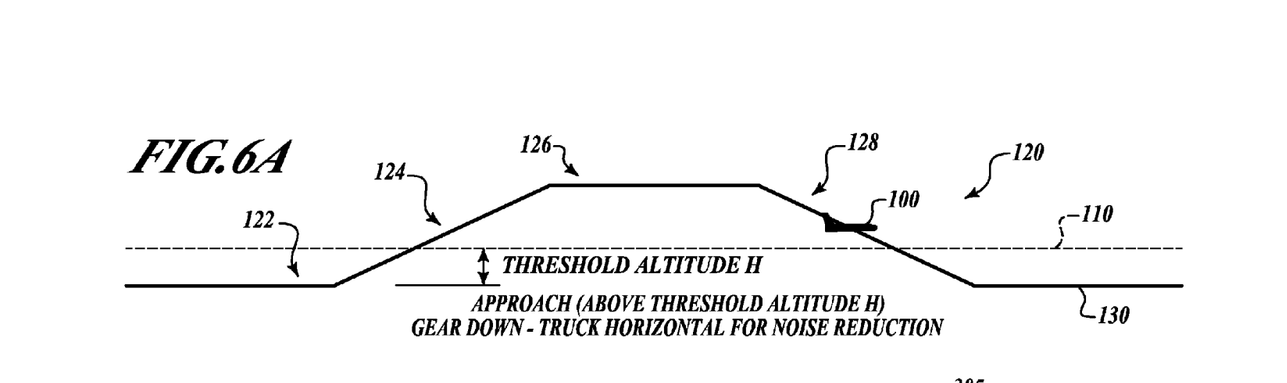
FIG. 6A is a schematic representation of an aircraft at an approach to landing, when landing gear is down, above a depicted threshold altitude.
Figure 6B:
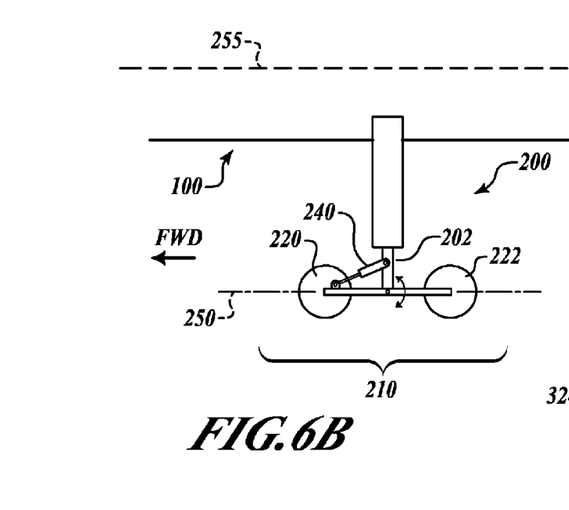
FIG. 6B is a schematic representation of a side view of a multi-axle landing gear truck with a plane through axles of the truck substantially parallel to the waterline of the aircraft.
Figure 6C:
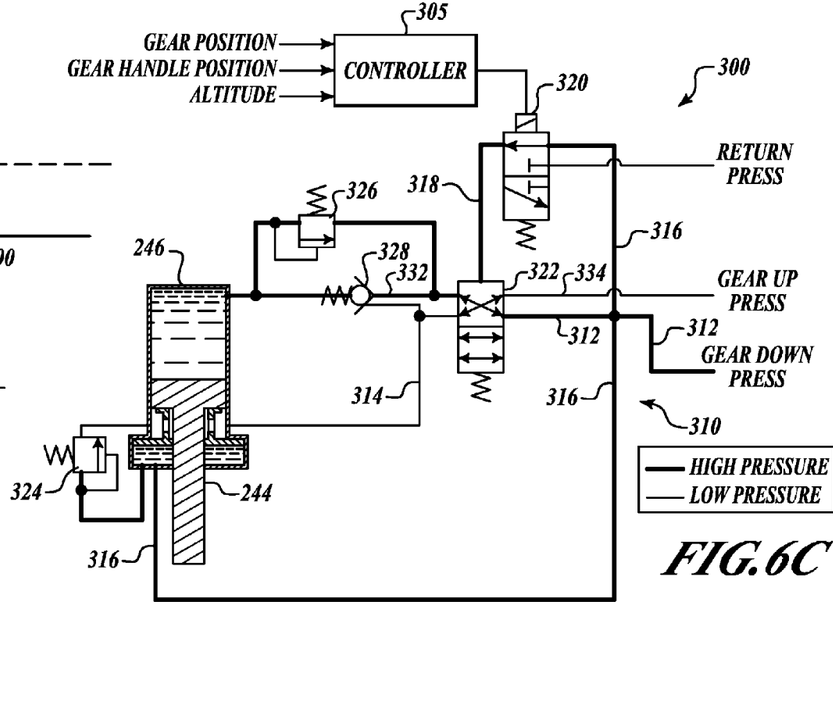
FIG. 6C is schematic flow diagram depicting an embodiment of a hydraulic control system of the invention configured to control orientation of the multi-axle landing gear truck.

As shown in FIGS. 5A-C, when the aircraft 100 is flying at cruising altitude, both the landing gear up and landing gear down hydraulic circuit pressures are low in the hydraulic circuit 310. The piston rod 244 is retained in position by back pressure since pressure in the sleeve 246 above piston rod 244 cannot be relieved through check valve 328 or pressure relief valve 326, unless the pressure surges beyond the setting of pressure relief valve 326. Accordingly, the landing gear truck 210 is held in toes down position by trapped pressurized fluid in the sleeve 246 above piston rod 244. As a safety feature, if pressure in sleeve 246 increases due to thermal expansion, pressure operated relief valve 326 opens to permit fluid flow out of the actuator to relieve the excess pressure Referring to FIGS. 6A-C, the aircraft 100 is commencing an approach to landing and the landing gear is lowered. The aircraft is still above the threshold altitude. The controller receives inputs regarding altitude, gear position, and landing gear handle position. Based on this input, the controller opens solenoid valve 320. Since the landing gear down portion of the hydraulic circuit 310 is at high pressure, pressure from high pressure line 312 pressurizes line 316 causing fluid to lift the floating piston 248 to its stop position against the sleeve 246. In addition, line 312 pressurizes line 332 through open horizontal positioning valve 322. High pressure fluid passes through pressure operated check valve 328 and into sleeve 246 above piston rod 244. Consequently, the position of piston rod 244 is again determined by downward pressure above it and upward urging from the floating valve 248 below it. The hydraulic circuit pressure is controlled to position piston rod 244 such that the actuator retracts to the extent required for a plane 250 through the axles of the landing gear truck is substantially parallel to the aircraft waterline. This orientation reduces noise during landing maneuvers.

Figure 7A:
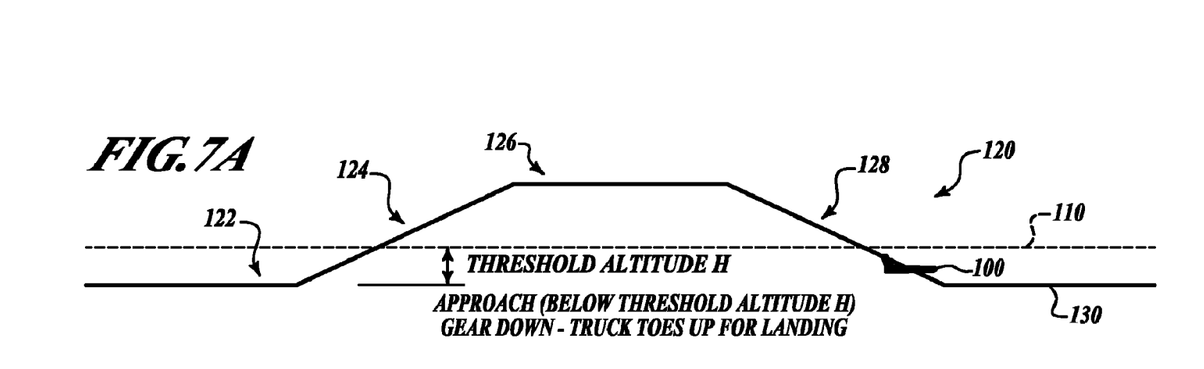
FIG. 7A is a schematic representation of an aircraft approaching landing and below a depicted threshold altitude.
Figures 7B, 7C:
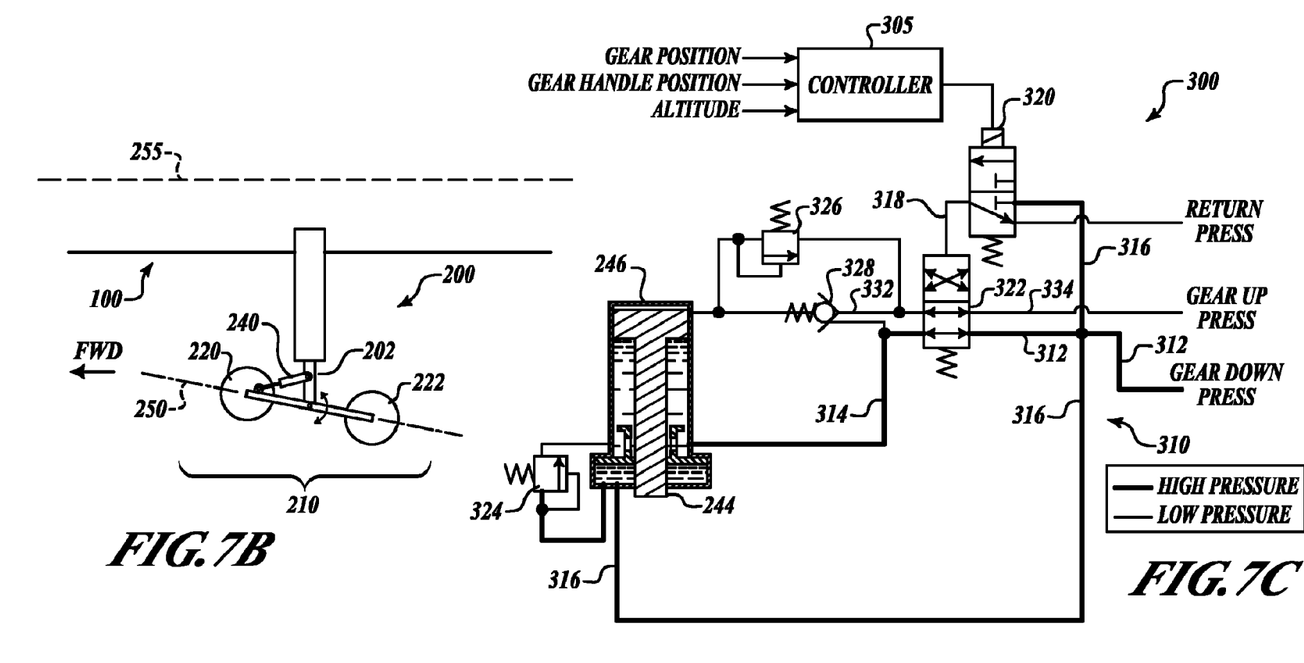
FIG. 7B is a schematic representation of a side view of a multi-axle landing gear truck in a toes up orientation.
FIG. 7C is schematic flow diagram depicting an embodiment of a hydraulic control system of the invention configured to control orientation of the multi-axle landing gear truck.

In FIGS. 7A-C the aircraft 100 approaches for a landing and is now below the threshold altitude. At this point, the controller closes the solenoid operated control valve 320 and the horizontal positioning valve 322 diverts high pressure fluid from line 312 to line 314. Fluid in line 314 applies pressure under piston rod 244 causing it to lift to its fullest extent. High pressure in line 314 also opens the pressure operated check valve 328 to allow fluid flow out of the cylinder 246 as the piston rod 244 is raised. While line 312 also pressurizes fluid in line 316, and fluid from line 316 raises floating piston 248, the floating piston has no effect on the location of piston rod 244. If pressure under floating piston 248 is too high and exceeds design pressure, a pressure operated relief valve 324 opens to relieve pressure. The location of piston rod 244 causes the actuator to retract, thereby lifting a front portion of the landing gear truck 210 so that it assumes a toes up orientation for touch down. Upon touch down, landing forces cause reorientation of the landing gear truck 210 and hydraulic circuit 310 to assume the configurations shown in FIGS. 1A-C.

In one embodiment, the invention provides a method of reducing noise generated by an aircraft landing gear during landing that includes: positioning the aircraft landing gear, the landing gear comprising a multi-axle truck; orienting the multi-axle truck such that a plane through axles of the truck is substantially parallel to a waterline of the aircraft; and maintaining the angle of the multi-axle truck during air-borne landing maneuvers. Optionally, the orienting step includes orienting the multi-axle truck such that plane through axles of the multi-axle truck is at an angle of less than about 5 degrees or less than about 3 degrees to the waterline of the aircraft. The landing gear may have an actuator so that the orienting of the multi-axle truck comprises extending or retracting the actuator. The method may include re-orienting the landing gear at a point of incipient landing. The method may also include controlling the orienting of the multi-axle truck by a controller that receives inputs comprising landing gear position, gear handle position, and aircraft altitude. The controlling of the orienting of the multi-axle truck may include controlling a hydraulic pressure control valve of a hydraulic pressure control system that is in fluid communication with a piston of a truck position actuator such that controlled hydraulic pressure determines a degree of extension of a piston in a truck position actuator, and the degree of extension of the piston determines the orienting of the multi-axle truck. The method may also further include allowing relief of pressure in the hydraulic pressure control system to permit the multi-axle truck to assume a landing attitude when wheels of the multi-axle truck are subjected to landing forces. The controller may be configured to orient the multi-axle truck in the plane based on aircraft altitude. The orienting of the multi-axle truck may reduce noise by about 3 dB relative to an aircraft not orienting the multi-axle truck within the plane.

In another embodiment, the invention provides a method of reducing noise generated by an aircraft landing gear that has a multi-axle truck during aircraft take off. This method includes: orienting the multi-axle truck such that a plane through axles of the truck is substantially parallel to a waterline of the aircraft; and maintaining an angle of orientation of the multi-axle truck until the landing gear may be retracted. The orienting may include orienting the multi-axle truck such that plane through axles of the multi-axle truck is at an angle of less than about 5 degrees or less than about 3 degrees to the waterline of the aircraft. The landing gear may have an actuator and the orienting of the multi-axle truck comprises extending or retracting the actuator. The method may include controlling the orienting of the multi-axle truck by a controller that may receive inputs including landing gear position and aircraft altitude. The optional step of controlling may include controlling a hydraulic pressure control valve of a hydraulic pressure control system that is in fluid communication with a piston of a truck position actuator such that controlled hydraulic pressure determines a degree of extension of a piston in a truck position actuator, and the degree of extension of the piston determines the orienting of the multi-axle truck. The controller may be configured to orient the multi-axle truck in the plane based on aircraft altitude. The orienting of the multi-axle truck may reduce noise by about 3 dB relative to an aircraft not positioning the multi-axle truck within the plane.

In another embodiment, the invention provides an improvement in a method of conducting landing and take off maneuvers in aircraft equipped with a multi-axle truck landing gear. The improvement includes: orienting the multi-axle truck such that a plane through axles of the truck is substantially parallel to a waterline of the aircraft; and maintaining an angle of orientation of the multi-axle truck during take off and landing maneuvers to reduce noise by about 3 dB, relative to an aircraft not orienting the multi-axle truck in the plane. The improvement may include orienting the multi-axle truck such that the plane through axles of the multi-axle truck is at an angle of less than about 3 degrees to the waterline of the aircraft. The improvement may include using a controller to control the orienting of the multi-axle truck based on information comprising aircraft altitude. The controller may control a hydraulic pressure control valve of a hydraulic pressure control system that is in fluid communication with a piston of a truck position actuator such that controlled hydraulic pressure determines a degree of extension of a piston in a truck position actuator, and the degree of extension of the piston determines the orienting of the multi-axle truck.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method of reducing noise generated by an aircraft landing gear during landing, the method comprising:
    positioning the aircraft landing gear to a lowered position during an air-borne landing maneuver, the landing gear comprising a multi-axle truck, said multi-axle truck oriented in a toes up or toes down position during said positioning;
    orienting the multi-axle truck to an angle of orientation while in said lowered, position such that a plane through axles of the truck is substantially parallel to deviate less than about 5 degrees with respect to a waterline of the aircraft, said orienting according a hydraulic pressure control system; and
    maintaining the angle of orientation in said lowered position of the multi-axle truck during said air-borne landing maneuver including an approach to landing; and,
    reorienting the multi-axle truck from said angle of orientation in said lowered position to a toes up position, said reorienting initiated upon determining that said aircraft is below a predetermined altitude value prior to touchdown.

2. The method of claim 1, wherein said angle of orientation is less than about 3 degrees to the waterline of the aircraft.

3. The method of claim 1, wherein the landing gear comprises an actuator adapted for orienting the multi-axle truck.

4. The method of claim 1, further comprising controlling the orienting of the multi-axle truck by a controller, the controller receiving inputs comprising landing gear position and said aircraft altitude.

5. The method of claim 4, wherein the controlling of the orienting of the multi-axle truck comprises controlling a hydraulic pressure control valve of said hydraulic pressure control system that is in fluid communication with a piston of a truck position actuator such that controlled hydraulic pressure determines a degree of extension of a piston in a truck position actuator, and the degree of extension of the piston determines the orienting of the multi-axle truck such that the plane through axles of the truck is substantially parallel to a waterline of the aircraft.

6. The method of claim 5, further comprising allowing relief of pressure in the hydraulic pressure control system to permit the multi-axle truck to assume a landing attitude when wheels of the multi-axle truck are subjected to landing forces.

7. The method of claim 1, wherein the orienting of the multi-axle truck reduces noise by about 3 dB relative to an aircraft not orienting the multi-axle truck to said angle of orientation.

8. An improvement in a method of conducting landing and take off maneuvers in aircraft equipped with a multi-axle truck landing gear, the improvement comprising:
    orienting the multi-axle truck to an angle of orientation, said orienting with said landing gear in a lowered position, said angle of orientation such that a plane through axles of the truck is substantially parallel to deviate less than about 5 degrees with respect to a waterline of the aircraft, said orienting according to a hydraulic pressure control system;
    maintaining said angle of orientation in said lowered position of the multi-axle truck during take off and landing maneuvers including approach to landing to reduce noise, relative to an aircraft not orienting the multi-axle truck to said angle of orientation; and
    reorienting the multi-axle truck from said angle of orientation in said lowered position to a toes up position prior touchdown in said landing maneuver and reorienting the multi-axle truck to said angle of orientation in said lowered position during ascent in said take off maneuver, said reorienting initiated upon determining that said aircraft is respectively above a predetermined altitude value following take off in said take off maneuver or below said predetermined altitude value prior to touchdown in said landing maneuver;
    wherein, said multi-axle truck is oriented in a toes-up or toes down position during lowering and retracting of said landing gear.

9. The improvement of claim 8, wherein said angle of orientation is less than about 3 degrees to the waterline of the aircraft.

10. The improvement of claim 8, wherein a controller controls the orienting of the multi-axle truck based on information comprising said aircraft altitude.

11. The improvement of claim 10, wherein the controlling of the orienting of the multi-axle truck comprises controlling a hydraulic pressure control valve of said hydraulic pressure control system that is in fluid communication with a piston of a truck position actuator such that controlled hydraulic pressure determines a degree of extension of a piston in a truck position actuator, and the degree of extension of the piston determines the orienting of the multi-axle truck.

* * * * *